United States Patent [19]

Stephen et al.

[11] Patent Number: 5,753,019
[45] Date of Patent: May 19, 1998

[54] PIGMENTED MIRROR RESIN COATINGS

[75] Inventors: Mathew Stephen, Richardson; Ole Gerhard Torgussen, Carroliton, both of Tex.

[73] Assignee: Sureguard, Inc., Grand Prairie, Tex.

[21] Appl. No.: 833,481

[22] Filed: Apr. 7, 1997

Related U.S. Application Data

[63] Continuation of Ser. No. 248,088, May 24, 1994, Pat. No. 5,632,810, which is a continuation-in-part of Ser. No. 754,898, Sep. 4, 1991, abandoned, and Ser. No. 902,206, Jun. 22, 1992, Pat. No. 5,314,532.

[51] Int. Cl.$^6$ .............. C09D 5/08; C09D 191/00; B32B 15/08; B32B 17/10

[52] U.S. Cl. .............. 106/253; 106/14.24; 106/14.42; 106/254; 106/256; 106/263; 106/719; 106/432; 106/480; 106/493; 524/195; 359/838; 428/425.8; 428/432; 428/433; 428/434; 428/458; 428/460; 428/461; 428/463

[58] Field of Search .............. 106/253, 254, 106/256, 203, 419, 432, 480, 493, 14.24, 14.42; 428/433, 434, 432, 425.8, 458, 460, 461, 463, 912.2; 359/838; 524/195

[56] References Cited

U.S. PATENT DOCUMENTS

| | | | |
|---|---|---|---|
| 1,948,106 | 2/1934 | Franck | 423/368 |
| 3,039,848 | 6/1962 | Schaus | 423/368 |
| 3,846,148 | 11/1974 | Nordyke . | |
| 3,852,087 | 12/1974 | Nordyke . | |
| 4,707,405 | 11/1987 | Evans | 428/336 |
| 5,075,134 | 12/1991 | Sanford | 427/165 |
| 5,094,881 | 3/1992 | Sanford | 417/162 |

FOREIGN PATENT DOCUMENTS

| | | |
|---|---|---|
| 905959 | 7/1960 | United Kingdom . |

*Primary Examiner*—David Brunsman
*Attorney, Agent, or Firm*—Lowe, Price, LeBlanc & Becker

[57] ABSTRACT

Mirror resin backings containing antioxidant pigments which are cyanamide derivatives of metals, are protective backing coatings for glass substrates and mirrors. The resin backings are melamine based resin coatings which provide anti-corrosion protection for the metal layers with metal cyanamide antioxidant pigments.

21 Claims, No Drawings

PIGMENTED MIRROR RESIN COATINGS

CROSS REFERENCE TO RELATED APPLICATIONS

This application is a continuation of application Ser. No. 08/248,088 filed May 24, 1994, now U.S. Pat. No. 5,632,810 which is a continuation in part of application Ser. No. 07/754,898, filed Sep. 4, 1991, now abandoned, and a Continuation in Part of application Ser. No. 07/902,206, filed Jun. 22, 1992, now U.S. Pat. No. 5,314,532.

FIELD OF THE INVENTION

This invention relates to improved hydrophilic stable coatings capable of protecting thin metallic films such as those on mirrors from corrosive decomposition. More particularly, the present invention relates to improved coatings for mirror backings which comprise combinations of organic resin polymers in aqueous or non-aqueous mediums and soluble salt and contaminant-free antioxidant scavenger pigments. Aqueous coatings (paint) for mirrors have not been available until the development of this invention. Accordingly, this invention provides aqueous coatings or paints as mirror backings.

BACKGROUND OF THE INVENTION

Mirrors are made by the successive application of various metals, preferably silver and copper films of between 800 angstroms and 1,500 angstroms in thickness on suitable substrates of glass or plastics such as polycarbonates, by wet chemical plating processes or vacuum metallizing, followed by a paint coating application, usually known as a mirror backing.

Metallic layers are applied to glass substrates by one of three general methods, 1) electroplating, 2) chemical deposition, or 3) galvanic deposition. Galvanic deposition is the current method of choice and is now widely used. Usually a silver layer is applied and a copper layer deposited on the silver layer. The copper layer is important to provide good adherence of the backing to the silver layer. The present invention employs the galvanic deposition system.

It is known that reflective silver layers on mirrors, even when protected by "backing" coatings are extremely sensitive to corrosive decomposition when exposed to moisture, contaminants in the atmosphere, salt, hydrogen sulfide, ammonia, and chlorides, which are present in domestic environments. It is also known that zinc phosphate or zinc salts of dicarboxylic acids, commonly applied as corrosion inhibitors in protective primers on steel or aluminum, contrary to expectations, do not work well in mirror backing coatings and actually exhibit corrosive action on the silver layer.

Various mirror backing coatings have been proposed by the prior art, including coatings which comprise mixtures of an organic resin and pigment. For example, U.S. Pat. No. 4,707,405 to Evans et al, discloses a mirror backing coating which comprises an organic film forming resin and a cyanamide salt of a non-lead metal. The cyanamide salt is said to be a salt of group IIA or group IIB metal such as calcium, zinc or magnesium, with the preferred salt being calcium cyanamide. It is believed that the calcium and magnesium cyanamides have not been successful because both are water soluble, highly alkaline "non-pigment" products which interfere in detrimental fashion with curing processes of coating systems organic material. In addition, they exhibit only marginal corrosion preventive activity on silver, which is expected considering that typical technical grade calcium cyanamides contain considerable amounts (e.g., 1% $CaS_2$) of soluble sulfide species as impurities. Therefore, the zinc cyanamides known heretofore have not gained commercial-acceptance.

In parent application Ser. Nos. 07/754,898 and 07/902,206, an invention is set forth which provides superior anti-corrosion mirror backings using a non-lead pigment.

The present invention provides improved paint and coating formulations for mirror backings which have excellent long term corrosion preventive protection of the mirror reflective silver layer utilizing a novel resin formulation.

SUMMARY OF THE INVENTION

It is accordingly one object of the present invention to provide an improved paint or coating to protect thin metal films such as silver and copper against corrosive decomposition.

A further object of the present invention is to provide an improved mirror backing paint coating, including aqueous based coatings, which contain a cyanamide antioxidant pigment, and which is capable of protecting thin metallic films from chemical decomposition while exhibiting hydrolytic stability.

A further object is to provide a novel resin backing which provides an effective non-corrosive mirror backing with any antioxidant pigment.

Other objects and advantages of the present invention will become apparent as the description thereof proceeds.

In satisfaction of the foregoing objects and advantages, there are provided by the present invention, protective mirror backing formulations which comprise the combination of a resin polymer contained in an aqueous or non-aqueous medium, and one or more refined cyanamide antioxidant scavenger pigments. The soluble antioxidant scavenger cyanamide pigment may be based on metals such as lead, zinc, nickel, cobalt, etc., and especially includes complexes of any of these metals with cyanamides and di-cyanamides.

Also provided by the present invention is a method for the protection of thin metal films contained on the backs of glass or plastic objects such as mirrors which comprises applying thereto an improved paint or coating which comprises a combination of an organic resin polymer contained in an aqueous or non-aqueous medium in combination with one or more soluble cyanamide antioxidant scavenger pigment.

DESCRIPTION OF PREFERRED EMBODIMENTS

According to the present invention, it has been discovered that the metallic (e.g. silver) reflective layers of mirrors which contain protective coatings thereon are substantially improved by use of a melamine based resin formulation which provides excellent non-corrosive mirror backings with any metal containing cyanamide antioxidant pigment.

In the prior art, known manufacturing procedures provide pigments such as zinc cyanamide by treating zinc oxide with an excess of urea or di-cyanamide under nitrogen or vacuum, initially at 135° to 200° C. and then calcinating at 600°–800° C. for two hours. The shortcomings of this energy intensive procedure, are that it yields a product of relatively "closed" texture, characterized by low specific surface area and porosity, and consequently of reduced reactivity. Zinc cyanamide produced by calcination does not exhibit the high degree of corrosion preventive activity necessary in mirror backing systems, and thus, cannot be considered as "pigment" grade products for mirror applications.

Also known are wet manufacturing processes (U.S. Pat. Nos. 1,948,106 and 3,039,848) which produce zinc cyanamide by precipitation by reacting soluble zinc salts with water soluble, usually alkali, salts of hydrogen cyanamide, expressed as:

$$ZnCO_3 + ZnH_3 \rightarrow ZnNCN + 3H_2O.$$

The appearance in the system of the soluble by-products of the reaction is the major disadvantage of these procedures. To eliminate them, extensive washing is required whereby large amounts of contained waste water are generated. More importantly, due to the fact that complete elimination of the soluble salt contaminants are usually not feasible, the quality of pigment grade zinc cyanamide produced according to such procedures is affected by the presence of trace amounts of usually corrosion promoter soluble by-products.

It is also known from British Patent No. 905,959 (1962), and Russian Patent 327,783 that basic mono-zinc cyanamide may be produced by initially preparing an aqueous solution of hydrogen cyanamide by reacting dissolved calcium cyanamide with $H_2SO_4$ or $CO_2$ and subsequently reacting the intermediate product with a zinc oxide slurry at 20° C. for one to two hours. This reaction proceeds as follows:

$$ZnO + H_2O + H_2NCN \rightarrow ZnNCN + H_2O.$$

After filtering the product and drying, this product typically contains 83–85% of zinc cyanamide, 13–15% of zinc oxide, and 2% water. One of the shortcomings of this manufacturing procedure is related to the process for preparation of the hydrogen cyanamide. As a result, the final product contains considerable amounts of the carbonic acid and sulfuric acid in soluble form. Sulfur containing impurities, representing 1–2% of technical grade calcium carbides, the usual raw material of the calcium cyanamide manufacturing processes, are accountable for the appearance of soluble sulfide species in the hydrogen cyanamide. For obvious reasons, the applicability in mirror backing formulations of a pigment grade zinc cyanamide produced by this process is rather limited.

By this invention unpurified as well as salt-free and contaminant-free pigments are provided from which aqueous and non-aqueous mirror backing coatings are made possible, the coatings having outstanding anti-corrosion and durability properties and are useful for long term protection. In the past, water soluble salts would create hydrophilic instability and incompatibility with the thin metallic films resulting in chemical decomposition and failure. The use of the novel resin formulation with unpurified and purified, e.g. salt-free and contaminant-free antioxidant cyanamide pigment coatings of this invention offer additional performance features with respect to the chemical bonding of the coating and the substrate.

In this specification, the expression "salt-free" means that the pigment contains not more than about 0.5% by weight of water soluble free salts and impurities (contaminants) incompatible with thin silver/copper metallic films and the like. "Antioxidant" means a pigment or pigments which inhibit oxidation of the substrate or metal layer and prevents saponification of the coating. "Scavenger" means a pigment or pigments which effectively display the ability to neutralize free sulfide and chloride ions produced or present during the corrosion process.

There are various physical and chemical properties which any pigment must have in order to function as a corrosion preventive component in a paint and coating system, particularly in a protective coating. Thus, the pigment must have dispersability in organic media, either aqueous or non-aqueous, relatively low oil absorption, low water solubility, neutral or slightly alkaline hydrolysis in the absence of water soluble salts or inorganic contaminants, and more critically, the capacity to interact with and provide specific corrosion promoting electro-chemical processes which occur on the protective surface. This capacity of a pigment grade product derives from its chemical compositional structure. However, its corrosion retardant activity as manifested in protective coatings must be determined by its water solubility.

Soluble salt-free contaminant-free antioxidant scavenger pigments function as a corrosion preventive component of protective coatings as in mirror backing coatings due to the optimal water solubility and hydrolyzable pH. However, it is reasonable to suppose that the characteristics of the product in its hydrogen sulfide scavenger capacity and specifically the antioxidant nature of the cyanamide moiety, generated by solubilization during interaction of the pigment with corrosion promoting processes, are primarily accountable for the protective activity provided.

According to one aspect of this invention, soluble salt-free and contaminant-free pigments are provided which enable the production of mirror backing compositions which exhibit durability and good appearance over long periods of time. According to this invention, soluble salt-free and contaminant-free metal cyanamide pigment suspensions are provided which are excellent quality pigments for mirror backings.

In another aspect of the invention, metal cyanamide pigments may be used which have not been purified or are not salt-free such as the cyanamide pigments disclosed in U.S. Pat. No. 4,707,405, U.S. Pat. No. 1,948,106, U.S. Pat. No. 3,039,848, British Patent No. 905,959 and Russian Patent No. 327,783. The novel resin formulations of the invention enable the effective use of any metal cyanamide pigment as a mirror backing pigment with excellent anti-corrosive properties.

The metal cyanamides may be a basic cyanamide salt or a complex salt which includes one or two or more metals in combination as well as mixtures and blends. The metal may be any metal of groups IIA and IIB of the Periodic Table, preferably lead, zinc, nickel, cobalt, or mixtures thereof.

Especially preferred materials are complex cyanamide salts which include two metal molecules complexed hydrogen cyanamides including Neutral Mono-Zinc Cyanamide, Nickel Bis-Cyanamide, Cobalt Bis-Cyanamide, Zinc Nickel-Dicyanamide, Zinc Cobalt-Dicyanamide, and mixtures thereof, as well as equivalent materials.

Neutral Mon-Zinc Cyanamide is expressed as:

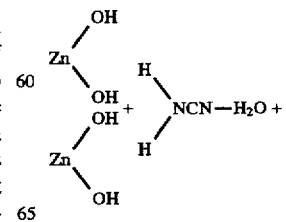

-continued

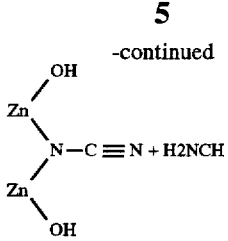

Acid Nickel Bis-Hydrogen Cyanamide:

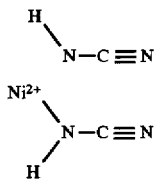

Acid Cobalt Bis Hydrogen Cyanamide:

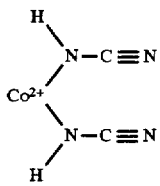

The salt free and contaminant free pigments of this type were obtained for use in this invention from Wayne Pigment Corporation, Milwaukee, Wis., USA and are available commercially.

| COMPARATIVE DATA FOR MONO-ZINC CYANAMIDE | | | |
|---|---|---|---|
| | Wayne Pigment | B.P. #905959 | U.S. #1968106 |
| ZnNCN | 93–94% | 83–85% | 50% |
| ZNo | <1% | 13–15% | — |
| ZnCO$_3$ | — | — | 50% |
| NCN Content | 37.0% | 19.5% | 18.5% |
| Neutral Zinc NCN | 100.0% | 69.0% | 50.0% |
| Basic Zinc NCN | 0 | 31% | U.K.* |
| H$_2$O | 5–6% | 2% | — |

*Contaminants Present

The mirror backing composition of this invention comprise organic film forming resins which are either water soluble (aqueous) or solvent soluble (non-aqueous). The organic film forming resin should be one which is compatible with the thin metallic film and will not promote deterioration and discoloration of the film. Thus, the resin should not contain functional groups which are reactive with the metal. Preferred organic film forming resins are those based on alkyd resins or acrylic resins which may further contain acrylic modified alkyd resins, polyurethane oils, vinyl halide polymers or copolymers, epoxy resins, urea resins, non-oil based urethane, phenol-formaldehyde resins. The film forming resin must contain melamine resins for cross-linking. The resins are curable by air drying, baking, ultra violet curable, or any other resin which is compatible with the soluble salt contaminant-free antioxidant pigment. Suitable solvents for non-aqueous resins comprise various aromatic and aliphatic hydrocarbons, alkyl esters, glycol ethers, and lower alkyl alcohols. Suitable solvents for aqueous resins comprise various glycol ethers, alkyl alcohols, and other water miscible solvents, all of which are known in the art.

A special feature of the invention is the provision of aqueous based coatings for mirrors as described herein. To Applicants' knowledge, such aqueous based mirror coatings have not been known heretofore.

In non-aqueous based systems, the components should be present in the following amounts:

| Component | Amount (wt. %) |
|---|---|
| Resin | 20–50 |
| Solvent | 10–40 |
| Pigment | 3–65 |

In aqueous based systems, the components should be present in the following amounts:

| Component | Amount (wt. %) |
|---|---|
| Resin | 10–45 |
| Solvent | 5–25 |
| Pigment | 3–65 |
| Water (preferably distilled) | 10–40 |

It is preferable that the cyanamide antioxidant pigment be contained in the resin coating in the amount of about 3% to about 65%, preferably about 7% to 30% by weight of the composition based on pigment solids. It is also preferable that the pigment have a particle size of less than about 0:25 microns.

The composition can also contain other components or additives, such as driers, flow control aids, anti-settling agents, dispersing aids, and the like, and mixtures thereof.

A particularly preferred coating formulation for such pigments comprises a mixture of a specially formulated mixture of alkyd resin or acrylic resins together with a melamine resin, solvents, additives and pigment. It has been discovered according to the present invention that the mixture of an alkyd resin or acrylic resin with melamine in combination with the other ingredients provide a resin formulation which will provide excellent non-corrosive characteristics as a mirror backing with any cyanamide pigment, including pigments which contain greater than 0.5% of soluble salts. Apparently the components of the resin formulation form cross-links in the mixture so as to form a very hard resin backing for the mirror. The hardness of the resin backing prevents the corrosive effect normally encountered with most resin backings. Accordingly, this resin formulation can be used with any metal cyanamide antioxidant pigment.

The preferred resin formulation contains the following amounts:

| Ingredients | Parts by Weight |
|---|---|
| Alkyd Resin or Acrylic Resin | 25–50 |
| Melamine Resin | 3–7 |
| Solvent | 5–15 |
| Pigment | 2–10 |

This formulation is normally used with fillers and extenders in a manner known to the art.

The alkyd resin is preferably a modified alkyd resin composition which is a mixture of dehydrated castor oil, linseed oil, phenolic resin, glycerin, phthalic anhydride and aromatic solvents.

The acrylic resin is any acrylic acid or methacrylic acid, or ester, or mixture thereof, as known in the art. A preferred acrylic resin system is available from Dock Resins Corporation under the trade name TA55-2.

A particularly preferred formulation of this type is as follows:

| Ingredients | Parts by Weight |
| --- | --- |
| Modified Alkyd or Acrylic Resin | 30-40 |
| Melamine Resin | 3-10 |
| Ester Solvents | 10-15 |
| Alcohols | 5-10 |
| Pigments | 5-15 |

The process of the invention for use of the coating comprises applying the composition of the invention to a thin metallic film, preferably such film on a glass substrate such as a mirror. The composition of the invention can be applied to the thin metallic film by any conventional method such as coating, roll coating, curtain coating, or spraying. The composition is preferably applied to the thin metallic film in a thickness of about 0.5 mil to about 3.5 mils. The composition is cured on the mirror by simply air drying, force heat drying or baking.

The following examples are presented to illustrate the invention but the invention is not to be considered as limited thereto. In the examples, parts are by weight unless otherwise indicated.

EXAMPLE I

The following pigments were obtained from Wayne Pigment Corp.

| NEUTRAL MONO-ZINC CYANAMIDE | |
| --- | --- |
| % Zinc as Zn | 57.7-58.3 |
| % N as N | 24.7-24.9 |
| % Zinc Cyanamide | 93.0-94.0 |
| % Crystal Water | 05.0-06.0 |
| COBALT BIS-HYDROGEN CYANAMIDE | |
| % Cobalt as Co | 39.9-40.3 |
| % N as N | 37.0-37.4 |
| % Co Bis-Hydrogen Cyanamide | 93.1-94.1 |
| ZINC-NICKEL DICYANAMIDE | |
| % Zinc as Zn | 51.2-51.8 |
| % Nickel as Ni | 4.3-4.5 |
| % N as N | 25.9-26.9 |
| % Cyanamide as NCN | 92.7-93.7 |
| % Crystal Water | 4.4-5.4 |
| ZINC-COBALT DICYANAMIDE | |
| % Zinc as Zn | 49.6-49.9 |
| % Cobalt as Co | 5.6-5.9 |
| % N as N | 26.4-27.4 |
| % Cyanamide as NCN | 93.0-94.0 |
| % Crystal Water | 4.3-5.3 |

EXAMPLE II

PREPARATION OF MIRROR BACKING COATING FORMULATIONS

A Mirror Backing Paint Formulation is prepared by mixing a soluble salt contaminant-free cyanamide pigment as described below, obtained from Wayne Pigment Corp., with a resin or resins as listed in the following tables. The initial dispersion mirror backing coating formula is ground to 6+ns Hegman and, allowed to stand overnight at room temperature. The non-aqueous material is reduced with solvent (Xylol) and the aqueous material reduced with D.I. water to applied viscosity of 35 seconds on a Number 3 G.E. Zahn Cup, and subsequently drawn down on pre-metallized (silver/copper) 12×12 inch, ¼ inch glass mirror panels with a 3 mil Bird draw down path bar and allowed to flash dry for two minutes at room temperature. The coating is then baked for four minutes at 350° F. to yield 1.5 dry film mils, then the mirror is aged 24 hours after which 3 inches is cut and removed from all four edges leaving a 6×6 inch panel for testing. The cut panels are then placed in a Salt Spray cabinet at 45 degree angles, exposed to 100% humidity and a 20% salt solution at 95° F. and evaluated every 150 hours of exposure for a total of 300 hours. The panel edges are evaluated for degree of edge creep (metal decomposition/ discoloration) expressed in millimeters. The face of the mirror is also evaluated for field spotting, pin holes, hazing, and metal decomposition.

The following table sets forth both aqueous and non-aqueous paint/coating formulations as mirror backing compositions of this invention.

EXAMPLE 1

TABLE I

Typical paint/coating, i.e. mirror backing formulations are made up of the following components:

| A) NON-AQUEOUS MIRROR BACKING FORMULATIONS | | | | | | | |
| --- | --- | --- | --- | --- | --- | --- | --- |
| Components | 1A | 2A | 3A | 4A | 5A | 6A | 7A |
| 1. MEDIUM OIL MODIFIED ALKYD or ACRYLIC | 40.0 | 40.0 | 40.0 | 40.0 | 40.0 | 40.0 | 40.0 |
| 2. MELAMINE RESIN 4.7 | 4.7 | 4.7 | 4.7 | 4.7 | 4.7 | 4.7 | 4.7 |
| 3. TALC | 17.50 | 21.50 | 21.50 | 18.50 | 18.50 | 21.50 | 25.00 |
| 4. PIGMENT | 10.00 | 10.00 | 10.00 | 10.00 | 10.00 | 10.00 | 10.00 |
| METHYLETHYL KETOXINE | 0.20 | 0.20 | 0.20 | 0.20 | 0.20 | 0.20 | 0.20 |
| 12% COBALT OCTOATE DRIER | 0.20 | 0.20 | 0.20 | 0.20 | 0.20 | 0.20 | 0.20 |
| 10% CALCIUM OCTOATE DRIER | 0.40 | .40 | 0.40 | 0.40 | 0.40 | 0.40 | 0.40 |
| XYLENE | 18.0 | 18.0 | 18.0 | 18.0 | 18.0 | 18.0 | 18.0 |
| 5. ZINC CYANAMIDE | 9.00 | — | — | — | — | — | — |

TABLE I-continued

Typical paint/coating, i.e. mirror backing formulations are made up of the following components:

| PIGMENT | | | | | | | |
|---|---|---|---|---|---|---|---|
| 6. NICKEL BIS CYANAMIDE PIGMENT | — | 5.00 | — | — | — | — | — |
| 7. COBALT BIS CYANAMIDE PIGMENT | — | — | 5.00 | — | — | — | — |
| 8. ZINC NICKEL DICYNAMIDE PIGMENT | — | — | — | 8.00 | — | — | — |
| 9. ZINC COBALT DICYANAMIDE PIGMENT | — | — | — | — | 8.00 | — | — |
| 10. LEAD ZINC CYANAMIDE PIGMENT | — | — | — | — | — | 5.00 | — |
| CONTROL | | | | | | | 0.00 |
| TOTALS | 100.00 | 100.00 | 100.00 | 100.00 | 100.00 | 100.00 | 100.00 |

B) AQUEOUS MIRROR BACKING FORMULATIONS

| Components | 1B | 2B | 3B | 4B | 5B | 6B | 7B |
|---|---|---|---|---|---|---|---|
| 1. WATER SOLUBLE ACRYLIC RESIN | 30.00 | 33.60 | 33.50 | 30.00 | 30.00 | 30.00 | 33.60 |
| TRIETHYLAMINE (TEA) | 2.00 | 2.00 | 2.00 | 2.00 | 2.00 | 2.00 | 2.00 |
| 2. TALC | 6.00 | 5.00 | 5.00 | 7.00 | 7.00 | 10.00 | 10.00 |
| 3. PIGMENT | 10.00 | 10.00 | 10.00 | 10.00 | 10.00 | 10.00 | 10.00 |
| ETHYLENE GLYCOL MONOBUTYLETHER | 6.50 | 6.50 | 6.50 | 6.50 | 6.50 | 6.50 | 6.50 |
| BUTYL ALCOHOL | 2.50 | 2.50 | 2.50 | 2.50 | 2.50 | 2.50 | 2.50 |
| 4. MELAMINE RESIN | 10.00 | 11.20 | 11.20 | 10.00 | 10.00 | 10.00 | 11.20 |
| DI-WATER | 24.00 | 24.20 | 24.20 | 24.00 | 24.00 | 24.00 | 24.20 |
| 5. ZINC CYANAMIDE PIGMENT | 9.00 | — | — | — | — | — | — |
| 6. NICKEL BIS CYANAMIDE PIGMENT | — | 5.00 | — | — | — | — | — |
| 7. COBALT BIS CYANAMIDE PIGMENT | — | — | 5.00 | — | — | — | — |
| 8. ZINC NICKEL DICYNAMIDE PIGMENT | — | — | — | 8.00 | — | — | — |
| 9. ZINC COBALT DICYANAMIDE PIGMENT | — | — | — | — | 8.00 | — | — |
| 10. LEAD ZINC CYANAMIDE PIGMENT | — | — | — | — | — | 5.00 | — |
| CONTROL | | | | | | | 0.00 |
| TOTALS | 100.00 | 100.00 | 100.00 | 100.00 | 100.00 | 100.00 | 100.00 |

TABLE II

SALT SPRAY TEST RESULTS

| TABLE I | 1A | 2A | 3A | 4A | 5A | 6A | 7A |
|---|---|---|---|---|---|---|---|
| 150 HRS./EDGE CREEP | .5 mm | .1 mm | .1 mm | 0 mm | 0 mm | 0 mm | 7 mm |
| 150 HRS./FIELD AREA/SPOTS | Pass | Pass | Pass | Pass | Pass | Pass | Fail |
| 300 HRS./EDGE CREEP | 1 mm | .5 mm | .40 mm | .5 mm | .40 mm | 0 mm | 10 mm |
| 300 HRS./FIELD AREA/SPOTS | Pass | Pass | Pass | Pass | Pass | Pass | Fail |

| TABLE I | 1B | 2B | 3B | 4B | 5B | 6B | 7B |
|---|---|---|---|---|---|---|---|
| 150 HRS./EDGE CREEP | .5 mm | 1 mm | 1 mm | .5 mm | .5 mm | .5 mm | 15 mm |
| 150 HRS./FIELD AREA/SPOTS | Pass | Pass | Pass | Pass | Pass | Pass | Fail |
| 300 HRS./EDGE CREEP | 2.0 mm | 2.5 mm | 2.0 mm | 1 mm | .90 mm | .5 mm | 23 mm |
| 300 HRS./FIELD AREA/SPOTS | Pass | Pass | Pass | Pass | Pass | Pass | Fail |

The following notes explain the components of the compositions of Table I.

A) Non-Aqueous: Acrylic Resin; NVW 50% Solvent n0butylacetate Acid No. =12. 1) Medium Oil Modified Alkyd; NVW 50% Solvent Xylol, Acid No. 12 or; 2) Melamine Resin, NVW 84% Polymeric, solvent butanol; 3) Talc; NVW 100%, Microfine magnesium silicate compatible with metals; 4) Pigment; NVW 100%, 96.0% Titanium Dioxide, 4.0% Carbon Black compatible with metals; 5) Zinc Cyanamide NVW 100%, Soluble Salt Contaminant-Free, Wayne Pigments; 6) Nickel Cyanamide NVW 100% Soluble Salt Contaminant-Free; Wayne Pigments; 7) Cobalt Bis-cyanamide NVW 100% Salt-Free. Wayne Pigments; 8) Nickel Zinc Cyanamide 14.0% Nickel Bis-cyanamide; 86.0% Zinc Cyanamide; Soluble Salt Contaminant-Free. Wayne Pigments; 9) Cobalt Zinc Cyanamide 14%; Cobalt Bis-cyanamide; 86.0% Zinc cyanamide. Soluble Salt Contaminant-Free; Wayne Pigments; 10) 33.5% Lead Cyanamide; 66.5% Zinc Cyanamide; Soluble Salt Contaminant-Free; Wayne Pigments B) Aqueous: 1) Water Soluble Acrylic Resin; NVW 70%; Solvent, 2-butoxyethanol, compatible with metals. Soluble Salt Contaminant-Free; Wayne Pigments; 2) Talc, NVW 100% Microfine, Magnesium Silicate compatible with metals; 3) Pigment: NVW 100%; 96.0% Titanium Dioxide, 4.0% Carbon Slack compatible with metals; 4) Melamine resin, NVW 84%, Polymeric. Solvent Butanol; 5) Zinc Cyanamide NVW 100%. Soluble Salt Contaminant-Free. Wayne Pigments; 6) Nickel Cyanamide NVW 100%. Soluble Salt Contaminant-Free; Wayne Pigments; 7) Cobalt Bis-cyanamide NVW 100%. Soluble Salt Contaminant-Free; Wayne Pigments; 8) Nickel Zinc Cyanamide 14%, Nickel Bis-cyanamide, 86% Zinc cyanamide. Soluble Salt Contaminant-Free; Wayne Pigments; 9) Cobalt Zinc cyanamide; 14% Cobalt Bis-cyanamide; 86% Zinc cyanamide; Soluble Salt Contaminant-Free; Wayne Pigments; 10) Lead Zinc cyanamide; 33.5% Lead cyanamide; 66.5% Zinc cyanamide, Soluble Salt Contaminant-Free; Wayne Pigments.

The non-aqueous mirror backing system of Table 1A was evaluated after 20% salt spray exposure for 150-300 hours respectively. The soluble salt contaminant-free antioxidant pigments performed well as inhibitors against corrosion of the silver/copper layers and ultimately blocked metal decomposition.

The aqueous mirror backing composition of Table 1B was evaluated after 20% salt spray exposure for 150-300 hours, respectively. The soluble salt contaminant-free antioxidant pigments performed as inhibitors against corrosion of the silver/copper layer to result in blocking of the corrosive decomposition of the metals. Because of the water soluble compatible nature of the soluble salt contaminant-free pigments, an additional performance feature was observed in relation to wet chemical plating of silver and copper metals in an aqueous state. This aqueous plating application provides ideal conditions for aqueous coatings which in turn utilizes an amine as in the metal application process, thus enabling the coating to "bite" the metal. Therefore, compositions which contain a high level of zinc cyanamide, up to 9% on total formula, resulted in good anti-corrosion protection. Additionally, when zinc cyanamide is doped at a 2-50% level with nickel bis-cyanamide, cobalt bis-cyanamide, or lead cyanamide, the corrosion retarding performance of the pigment system was enhanced, and a synergistic effect was observed.

EXAMPLE III

The following alkyd resin formulation was prepared by mixing the following components:

| Ingredient | Parts By Weights |
| --- | --- |
| Modified Alkyd Resin* | 37.0 |
| Melamine Resin | 5.0 |
| Ester Solvent | 11.0 |

-continued

| Ingredient | Parts By Weights |
| --- | --- |
| Alcohols | 6.0 |
| Aliphatic Solvent | 3.0 |
| Additives | 2.0 |
| Driers | 0.8 |
| Zinc Cyanamide (Wayne Pigment) | 8.5 |
| Red Oxide Pigment | 8.0 |
| Yellow Oxide Pigment | 2.5 |
| Barium Sulfate | 6.0 |
| Extenders & Fillers | 10.2 |
| TOTAL | 100.0 |

*Modified Alkyd Resin Composition
Dehydrated Castor Oil
Linseed Oil
Phenolic Resin
Glycerin
Phthalic Anhydride
Aromatic Solvents The coating was then applied to freshly silvered and coppered glass and exposed to an infrared oven at 240°-290° F. for 3.5 minutes.

The coated mirror panels were then exposed to 20% salt spray which continued for over 500 hours to comply with Federal Specification No. 33-M-411C. The panels were then evaluated for edge creep on the sides, creepage on the middle scribe, and for any spotting. The results of the 500 hours salt spray test are as follows:

| 500 HOURS SALT SPRAY TEST RESULTS | |
| --- | --- |
| DRY FILM THICKNESS OF COATINGS | 1.5 TO 1.8 MILS |
| EDGE CREEP (mm) | NONE |
| CREEPAGE ON MIDDLE SCRIBE | NONE |
| SPOTTING | NONE |

In addition to the above tests, the following industry standard tests were also performed. The results are as follows:

| 24 Hours | 5% Ammonia Vapor - Pass |
| --- | --- |
| 2 Hours | FERRIC CHLORIDE - Pass |
| 300 Hours | Humidity - Pass |

From the above results of the 500 hours Salt Spray test, it will be noted that the edge creep test showed no creep, there was no creepage on the middle scribe (a standard industry test) and there was no spotting.

EXAMPLE IV

The following acrylic resin formulation was prepared by mixing the following components:

| Ingredient | Parts By Weights |
| --- | --- |
| Acrylic Resin* | 37.0 |
| Melamine Resin | 5.0 |
| Ester Solvent | 11.0 |
| Alcohols | 6.0 |
| Aliphatic Solvent | 3.0 |
| Additives | 2.0 |
| Zinc Cyanamide (Wayne Pigment) | 8.5 |
| Red Oxide Pigment | 8.0 |
| Yellow Oxide Pigment | 2.5 |
| Barium Sulfate | 6.0 |

-continued

| Ingredient | Parts By Weights |
| --- | --- |
| Extenders & Fillers | 11.2 |
| TOTAL | 100.0 |

*Obtained from Dock Resins Corporation under tradename TZ 55-2.

The coating was then applied by curtain coater on top of freshly silvered and coppered glass. The glass panels were then exposed to an infrared oven at 240°–290° F. for 3.5 minutes.

The coated mirror panels were then exposed to 20% salt spray which continued for over 700 hours to comply with Federal Specification No. 33-M-411C. The panels were then evaluated for edge creep on the sides, creepage on the middle scribe, and for any spotting of the mirror. The results of the 700 hours salt spray test are as follows:

| 700 HOURS SALT SPRAY TEST RESULTS | |
| --- | --- |
| DRY FILM THICKNESS OF COATINGS | 1.5 TO 1.8 MILS |
| EDGE CREEP (mm) | NONE |
| CREEPAGE ON MIDDLE SCRIBE | NONE |
| SPOTTING | NONE |

In addition to the above tests, the following industry standard tests were also performed. The results are as follows:

| 24 Hours | 5% Ammonia Vapor - Pass |
| --- | --- |
| 2 Hours | FERRIC CHLORIDE - Pass |
| 480 Hours | Humidity - Pass |

The results of the 700 hour salt spray test show no edge creep, no creepage on the middle scribe and no spotting.

The invention has been described herein with reference to preferred embodiments. However, as obvious variations thereon will become apparent to those skilled in the art, the invention is not to be considered as limited thereto.

What is claimed is:

1. An article of manufacture comprising a glass substrate having a metal layer thereon, and a protective coating over said metal, said protective coating comprising a durable and long term protective coating for thin metal films, said protective coating being formed from a non-aqueous based coating composition which comprises the combination of:

(a) an organic resin polymer selected from the group consisting of alkyd resins and acrylic resins, each of said resins being combined with a sufficient amount of a melamine resin to cause cross linking with said alkyd resin or acrylic resin;

(b) a solvent; and (c) an anti-corrosion amount of an antioxidant scavenger pigment comprising a cyanamide compound of a metal, wherein said metal is selected from the group consisting of zinc, nickel, cobalt, lead, mixtures thereof, and blends of metal cyanamides; said non-aqueous based coating composition comprising:

| COMPONENT | AMOUNT (wt. %) |
| --- | --- |
| Alkyd resin or Acrylic Resin and melamine resin | 10–45 |
| Solvent | 10–40 |
| Pigment | 3–65 | and wherein the mixture of melamine resin with said alkyd resin or acrylic resin is effective to form a hard resin backing over said metal which minimizes corrosive effects.

2. An article according to claim 1, wherein the pigment comprises complex salts of cyanamide with at least two metals.

3. An article according to claim 1, wherein the pigment comprises a metal complexed with at least two equivalents of cyanamides.

4. An article according to claim 1, wherein the metal is acid or neutral zinc cyanamide.

5. An article according to claim 1, wherein the pigment is selected from the group consisting of neutral or acid zinc cyanamide, nickel bis-cyanamide, cobalt bis-cyanamide, zinc nickel dicyanamide, zinc cobalt dicyanamide, lead-zinc cyanamide, and mixtures thereof.

6. An article according to claim 1 which is a mirror and wherein the metal layer is gold or silver.

7. An article according to claim 1, wherein the protective coating is formed from the following resin composition:

| INGREDIENTS | PARTS BY WEIGHT |
| --- | --- |
| Alkyd resin or Acrylic Resin | 25–50 |
| Melamine Resin | 3–7 |
| Solvent | 5–15 |
| Pigment | 2–10 |

8. An article according to claim 1, wherein the resin is a polyurethane oil, vinyl-halide polymer or copolymer, epoxy resin, urea resin, non-oil based urethane resin, or phenol-formaldehyde resin.

9. An article according to claim 8, wherein the alkyd resin is a modified alkyd resin comprising a mixture of dehydrated castor oil, linseed oil, phenolic resin, glycerin, phthalic anhydride and aromatic solvents, and the acrylic resin is an acrylic acid or ester resin or methacrylic acid or ester resin.

10. An article according to claim 1, wherein the composition also comprises one or more driers, flow control aids, anti-settling agents, dispersing aids or mixtures thereof.

11. A composition for forming a protective coating on a thin metal layer applied to the back of a mirror, said protective coating being formed from a non-aqueous based coating composition which composition comprises the combination of:

(a) an organic resin polymer selected from the group consisting of alkyd resins and acrylic resins, each of said resins being combined with a sufficient amount of a melamine resin to cause cross linking with said alkyd resin or acrylic resin;

(b) a solvent; and (c) an anti-corrosion amount of an antioxidant scavenger pigment comprising a cyanamide compound of a metal, wherein said metal is selected from the group consisting of zinc, nickel, cobalt, lead, mixtures thereof, and blends of metal cyanides; said non-aqueous based coating composition comprising:

| COMPONENT | AMOUNT (wt. %) |
|---|---|
| Alkyd resin or Acrylic Resin and melamine resin | 10–45 |
| Solvent | 10–40 |
| Pigment | 3–65 | and wherein the mixture of melamine resin with said alkyd resin or acrylic resin is effective to form a hard resin backing over said metal which minimizes corrosive effects.

12. An composition according to claim 11, wherein the pigment comprises complex salts of cyanamide with at least two metals.

13. A composition according to claim 11, wherein the pigment comprises a metal complexed with at least two equivalents of cyanamides.

14. A composition according to claim 11, wherein the metal is acid or neutral zinc cyanamide.

15. A composition according to claim 11, wherein the pigment is selected from the group consisting of neutral or acid zinc cyanamide, nickel bis-cyanamide, cobalt bis-cyanamide, zinc nickel dicyanamide, zinc cobalt dicyanamide, lead-zinc cyanamide, and mixtures thereof.

16. A composition according to claim 11, wherein the solvent is selected from the group consisting of aromatic hydrocarbons, aliphatic hydrocarbons, alkyl esters, glycol ethers and lower alkyl alcohols.

17. A composition according to claim 11, wherein the solvent is selected from the group consisting of glycol ethers and alkyl alcohols.

18. A composition according to claim 11, wherein said composition is as follows:

| INGREDIENTS | PARTS BY WEIGHT |
|---|---|
| Alkyd resin or Acrylic Resin | 25–50 |
| Melamine Resin | 3–7 |
| Solvent | 5–15 |
| Pigment | 2–10 |

19. A composition according to claim 18, wherein the alkyd resin or acrylic resin is a polyurethane oil, vinyl-halide polymer or copolymer, epoxy resin, urea resin, non-oil based urethane resin, or phenol-formaldehyde resin.

20. A composition according to claim 19, wherein the alkyd resin is a modified alkyd resin comprising a mixture of dehydrated castor oil, linseed oil, phenolic resin, glycerin, phthalic anhydride and aromatic solvents, and the acrylic resin is an acrylic acid or ester resin or methacrylic acid or ester resin.

21. A composition according to claim 11, wherein the composition comprises one or more driers, flow control aids, anti-settling agents, dispersing aids or mixtures thereof.

* * * * *